United States Patent [19]

Teshima

[11] Patent Number: 5,221,884
[45] Date of Patent: Jun. 22, 1993

[54] NUMERICAL CONTROL APPARATUS
[75] Inventor: Takeo Teshima, Aichi, Japan
[73] Assignee: Mitsubishi Denki K.K., Tokyo, Japan
[21] Appl. No.: 615,958
[22] Filed: Nov. 20, 1990
[30] Foreign Application Priority Data Dec. 11, 1989 [JP] Japan .................................. 1-321090

[51] Int. Cl.⁵ ......................... G05B 19/19; B23Q 5/00
[52] U.S. Cl. .................................... 318/569; 318/567;
318/568.1; 318/632; 318/616
[58] Field of Search ................................ 318/560–646;
364/474.01–474.32

[56] References Cited
U.S. PATENT DOCUMENTS

| | | | |
|---|---|---|---|
| 4,707,780 | 11/1987 | Gose et al. | 318/632 |
| 4,859,920 | 8/1989 | Kurakake et al. | 318/567 |
| 4,885,515 | 12/1989 | Kurakake et al. | 318/567 |
| 4,941,104 | 7/1990 | Teshima et al. | 318/567 X |
| 4,961,034 | 10/1990 | Kakino et al. | 318/600 |
| 4,970,448 | 11/1990 | Torii et al. | 318/568.1 |
| 4,988,935 | 1/1991 | York | 318/568.18 |
| 4,992,715 | 2/1991 | Nakamura et al. | 318/649 |
| 5,057,759 | 10/1991 | Ueda et al. | 318/616 |

FOREIGN PATENT DOCUMENTS 3151830 7/1982 Fed. Rep. of Germany .
58-96307 6/1983 Japan .
63-155205 6/1988 Japan .

Primary Examiner—Paul Ip
Attorney, Agent, or Firm—Sughrue, Mion, Zinn, Macpeak & Seas

[57] ABSTRACT

The operation of positioning a machine by a numerical control apparatus is completed when it is determined that a current feedback value of a motor, which varies in response to deflection of the machine, is in a given range.

8 Claims, 6 Drawing Sheets

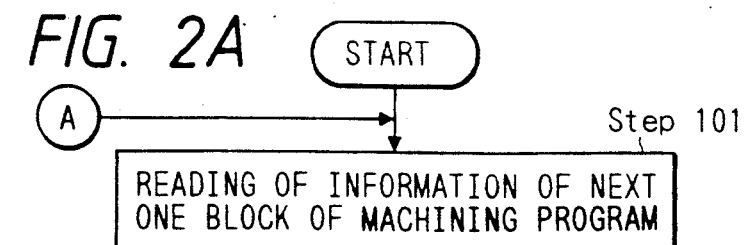
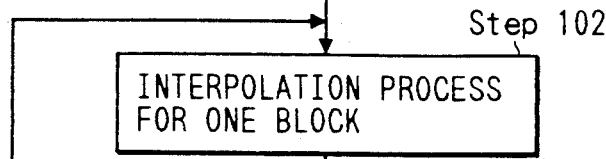
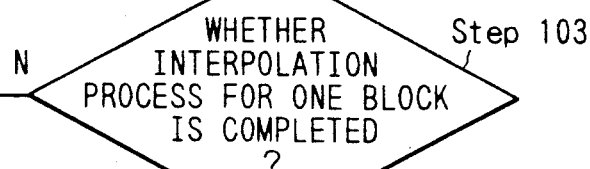
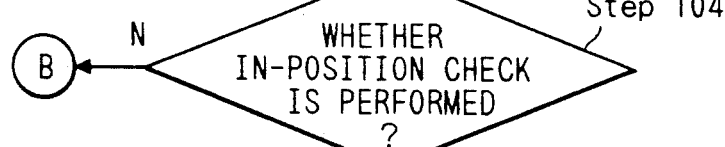
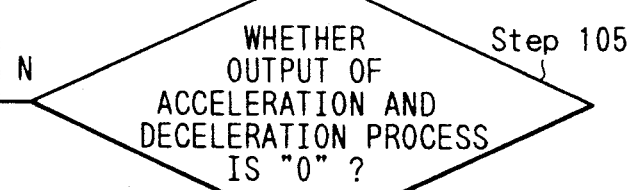
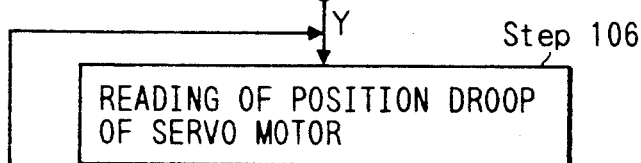
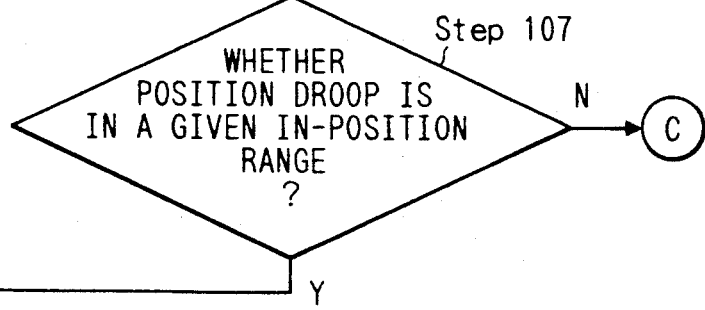

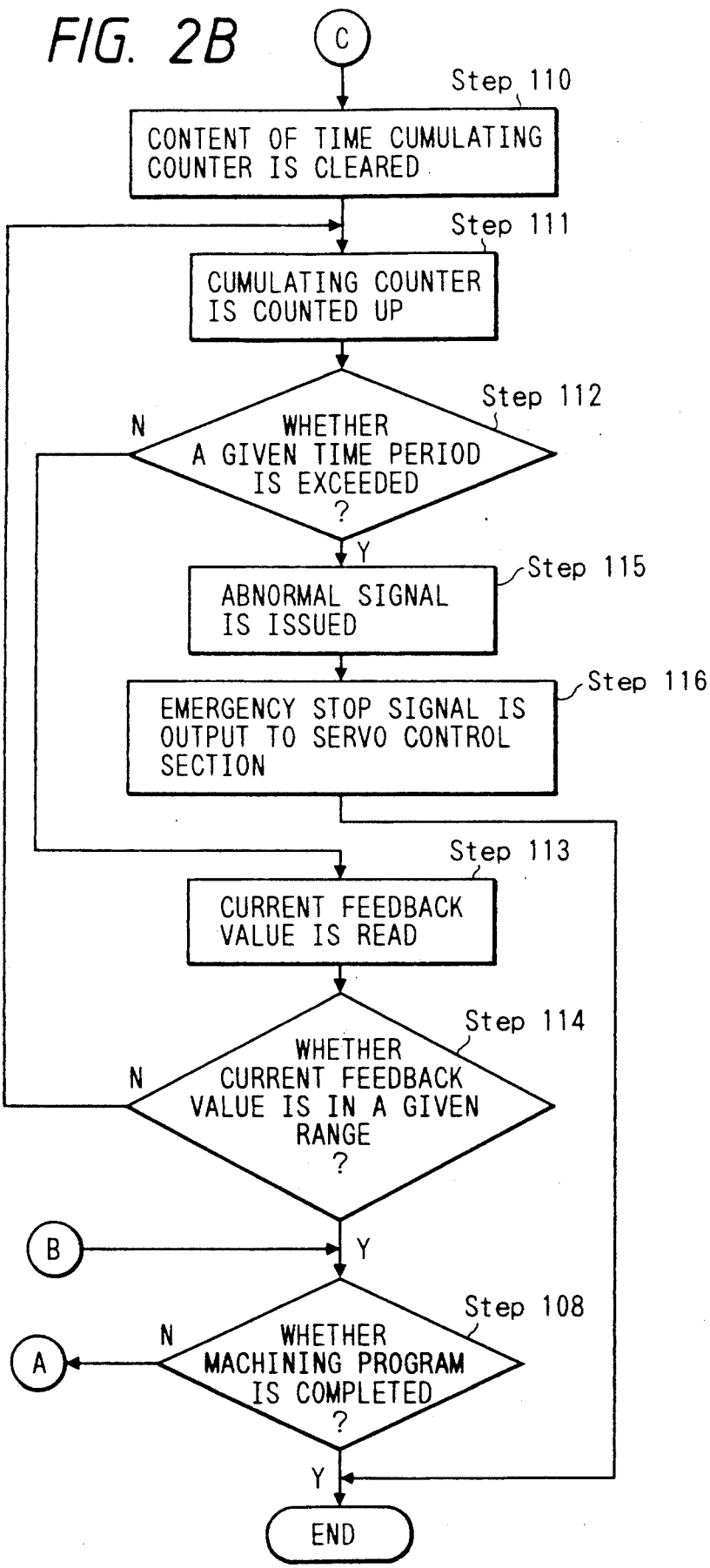

NUMERICAL CONTROL APPARATUS

BACKGROUND OF THE INVENTION

The present invention relates to an NC (numerical control) apparatus improved in determining whether or not a positioning operation of a machine is completed.

FIG. 3 is a block diagram showing the structure of a conventional numerical control apparatus. In the figure, an interpolation process unit 1 receives machining informations of each block of a machining program, for example, movement distance and movement speed, and outputs an incremental amount of movement of a controlling axis for every sampling. An acceleration and deceleration process unit 2 receives the interpolation information such as the incremental amount of movement for every sampling obtained from the interpolation process unit 1, executes an acceleration and deceleration process using, for example, a primary delay circuit (not shown), and outputs a position command (incremental amount of movement for one sampling) to a motor 6. A servo control section 3 controls a positioning operation of the motor 6 in response to the output of the acceleration and deceleration process unit 2. A position detector 4 and a speed detector 5 of the servo control unit 3 detect position and speed, respectively. A position control section 7 and a speed control section 8 of the servo control unit 3 control position and speed, respectively. Further, an amplifier 9 is disposed in the servo control unit 3.

FIG. 4 is a flow chart describing the operation of an in-position (completion of positioning) check process of the numerical control apparatus shown in FIG. 3. In the figure, steps 1 to 8 are operation steps of the process.

The operation of the above conventional numerical control apparatus will be described in the following. In step 1 shown in FIG. 4, machining information, for example, movement distance and movement speed, of one block of a machining program to be executed is input to the interpolation process unit 1. In step 2, the interpolation information such as the incremental amount of movement for each sampling is computed by the interpolation process unit 1 and is output to the acceleration and deceleration process unit 2. In step 3, it is determined whether or not the interpolation of one block has been completed. When it is determined that the interpolation of the one block has not been completed, the process returns back to step 2. When it is determined that the one block has been completed, the process advances to step 4. In step 4, it is determined whether or not the in-position check operation is executed for the machining information being input to the interpolation process unit 1. When it is determined that the in-position check operation is not necessary for the block, the process advances to step 8. When it is determined that the in-position check operation is necessary for the block, the process advances to step 5. In step 5, when the output of the acceleration and deceleration process unit 2 is 0, namely, when the movement command to the motor 6 is 0, the process advances to step 6. When the output of the acceleration and declaration process unit 2 is not 0, namely, when the movement command to the motor 6 is not 0, the process of step 5 is repeated until the output of the acceleration and deceleration process unit 2 becomes 0, namely, until the movement command to the motor 6 becomes 0. In step 6, the servo control unit 3 reads the position droop of the motor 6 in the servo system. In step 7, it is determined whether or not the position droop is in the given in-position range. When it is determined that the position droop is not in the given in-position range, the process returns back to step 6. When it is determined that the position droop is in the given in-position range, the process advances to step 8. In step 8, it is determined whether or not all the blocks of the machining program have been executed. When it is determined that all the blocks have been executed, the process is completed. When they have not been executed, the process returns back to step 1 and executes the next block.

FIG. 5 is a diagram describing a positioning error due to deflection of a machine which occurs when the conventional numerical control apparatus executes the positioning operation of the machine. In the figure, reference numeral 4 is a position detector, 6 is a motor, 10 is a workpiece, 11 is a ball screw, 12 is a bearing for supporting the ball screw 11, 13 is a nut, 14 is a tool, and 15 is a guide surface on which the tool 14 is moved.

The in-position check process of the conventional numerical control apparatus is executed as described above. For example, as shown in FIG. 5, at the time of positioning the machine, as in a semi-closed loop method, when the machine position detected by the position detector 4 is away from the machining point of the tool 14 against the workpiece 10, when the workpiece 10 is heavily cut, or when the sharpness of the tool 14 to the workpiece 10 is degraded, since the machine deflects as shown by the broken line of FIG. 5, even if the in-position check at the place where the position detector 4 detects a position, is conducted, the positioning accuracy at a machining point of the tool 14 to the workpiece 10 has an error e as shown in FIG. 5. Consequently, it is very difficult to assure a fixed accuracy being set in the in-position range.

In addition, as disclosed in Japanese patent laid-open No. 61-147791, whose title is "Abnormality monitor apparatus for automatic positioning unit", an apparatus for monitoring an abnormal state of a machine system at the time of positioning operation has been proposed. This apparatus uses a drive motor whose speed is controlled by a speed control unit. As the monitor means, the average value of current feedback values from the motor is monitored when the positioning operation of the machine system is controlled. However, generally, in machine tools, the cutting force and frictional force by the tool against a workpiece vary. Accordingly, the average value of the current feedback value of the motor also varies. Thus, even if the average value of the current feedback values of the motor is monitored in the manner described above, it is difficult to determine whether or not the positioning condition is abnormal.

SUMMARY OF THE INVENTION

An object of the present invention is to solve the above problem and to provide a numerical control apparatus which can execute an accurate in-position check operation even if there is a large error between the cutting position of the tool to a workpiece and the position detected by the position detector because of a large machine deflection caused by a heavy cutting operation of the workpiece or the like.

In the numerical control apparatus according to the present invention, when executing the machine in-position check operation, current feedback values (motor load currents) of a motor, which vary according to the deflection of the machine, are read by a current detector and then the current feedback values being read are checked to determine whether the machine positioning operation has been completed.

In the numerical control apparatus according to the present invention, since the current feedback value of the motor is equivalent to torque applied to the motor as the reaction force of the machine deflection, when the current feedback value of the motor is large, the machine deflection is also large and thereby the positioning accuracy at the machining point of the tool to the workpiece is bad; when the current feedback value of the motor is low, the machine deflection is small and thereby the positioning accuracy at the machining point of the tool to the workpiece is good. By using this phenomenon, the numerical control apparatus of the present invention can improve the positioning accuracy in executing the machine in-position check operation.

BRIEF DESCRIPTION OF THE DRAWINGS

FIG. 2A and 2B are flowcharts describing the operation of the in-position check process of the numerical control apparatus of FIG. 1;

DETAILED DESCRIPTION OF THE INVENTION

Figure 1:
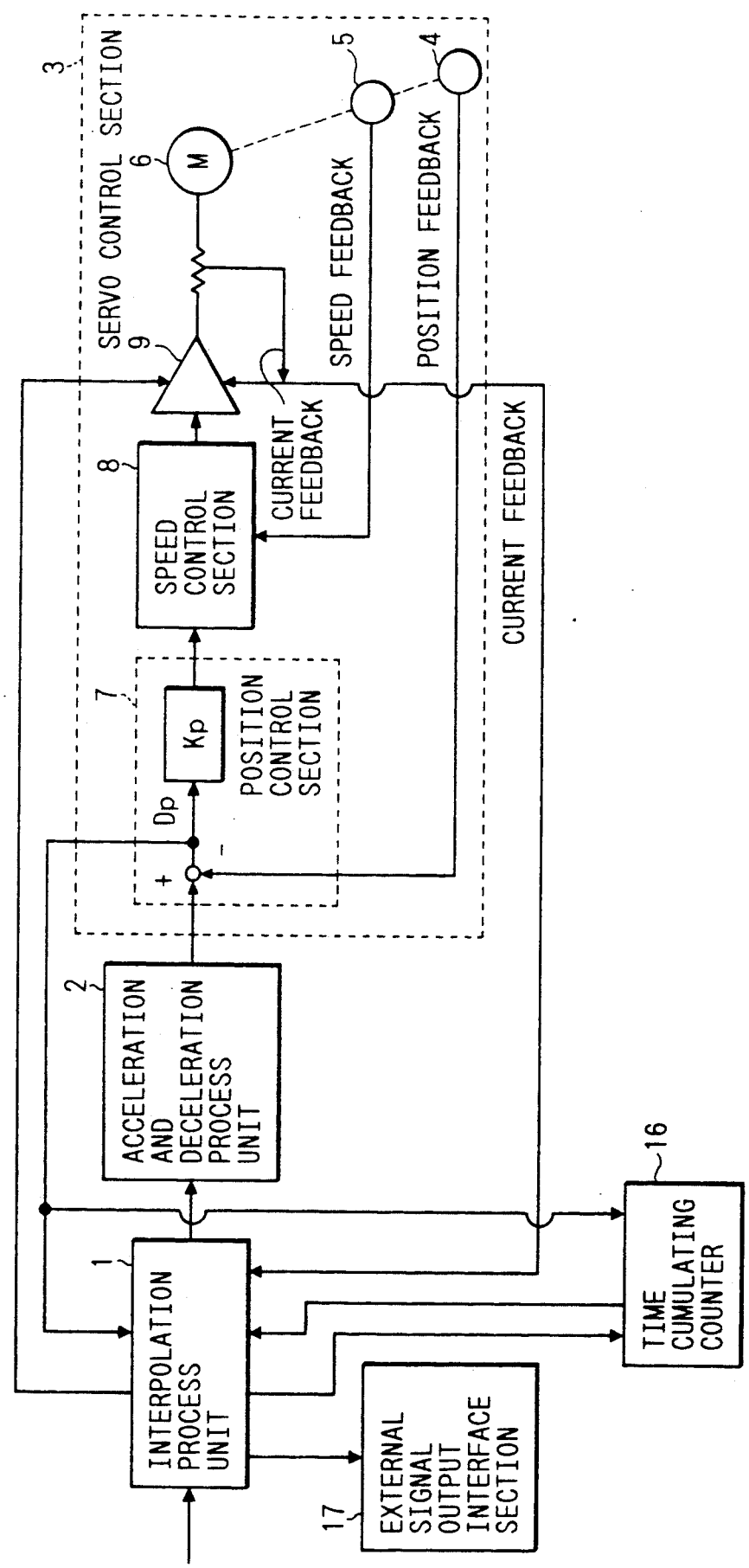
FIG. 1 is a block diagram showing the structure of a numerical control apparatus embodying the present invention.
Figure 3:
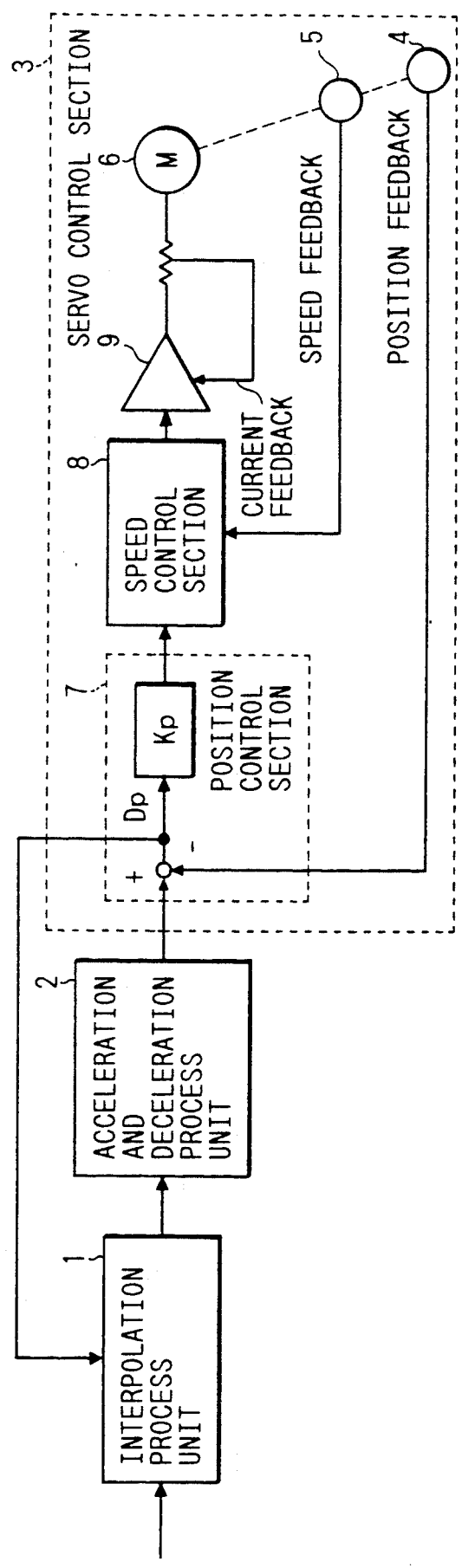
FIG. 3 is a block diagram showing the structure of a conventional numerical control apparatus.

FIG. 1 is a block diagram showing the structure of a numerical control apparatus embodying the present invention. In the figure, an interpolation process unit 1, an acceleration and deceleration process unit 2, a servo control section 3, a position detector 4, a speed detector 5, a motor 6, a position control section 7, a speed control section 8, an amplifier 9, and so forth are same as those of the conventional numerical apparatus shown in FIG. 3. A time cumulating counter 16 counts a time period when the position droop of the motor 6 in the servo control unit 3 becomes a given value or less and inputs the count value to the interpolation process unit 1. An external signal output interface section 17 transfers an abnormal state signal sent from the interpolation process unit 1 to an external unit, for example, a sequencer.

FIGS. 2A and 2B are flowchart describing the in-position check process operation in the numerical control apparatus of FIG. 1. In the figure, steps 101 to 108 and steps 110 to 116 show the process steps.

Figure 4:
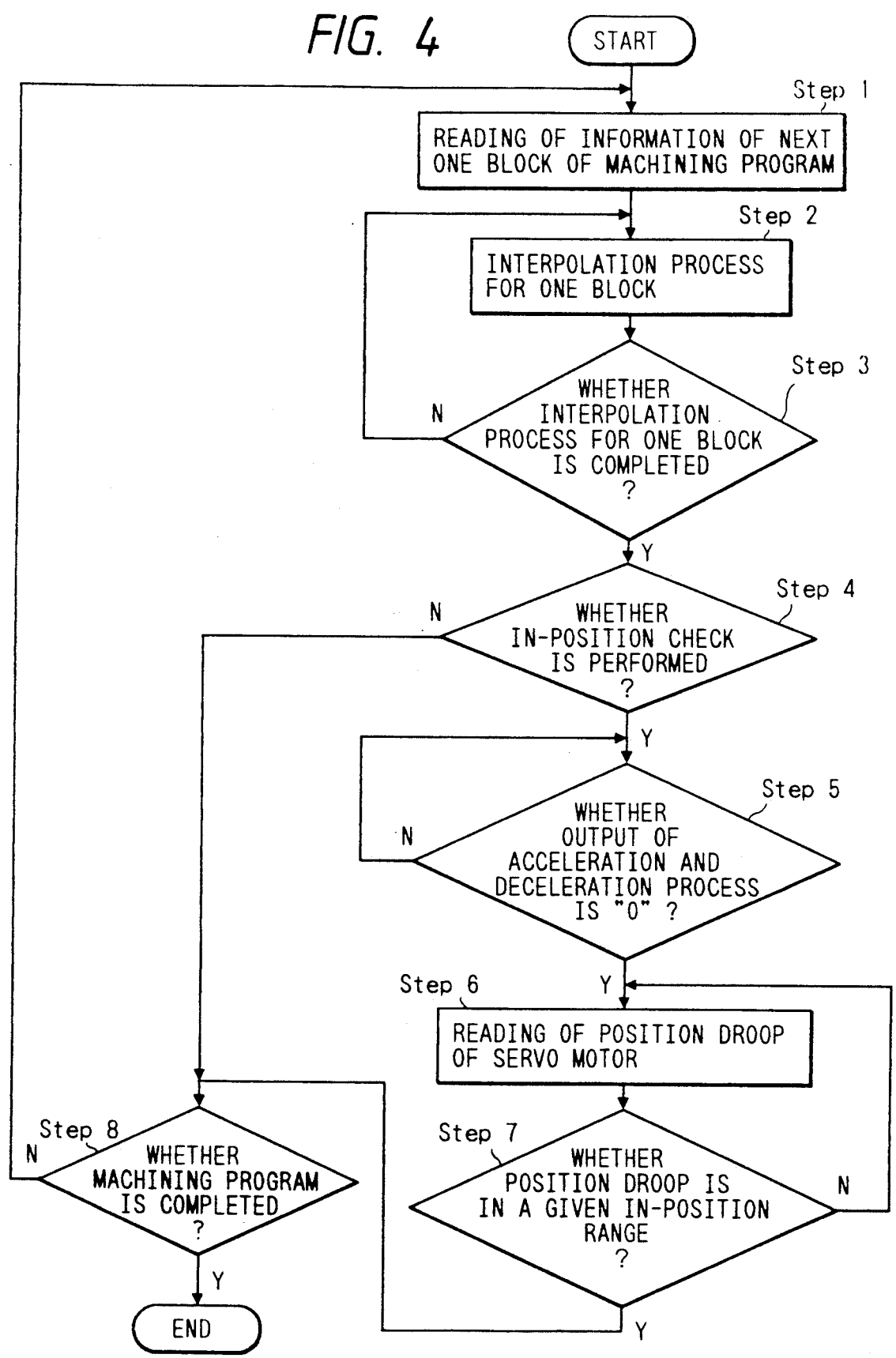
FIG. 4 is flowchart describing the operation of the in-position check process of the numerical control apparatus of FIG. 3.
Figure 5:
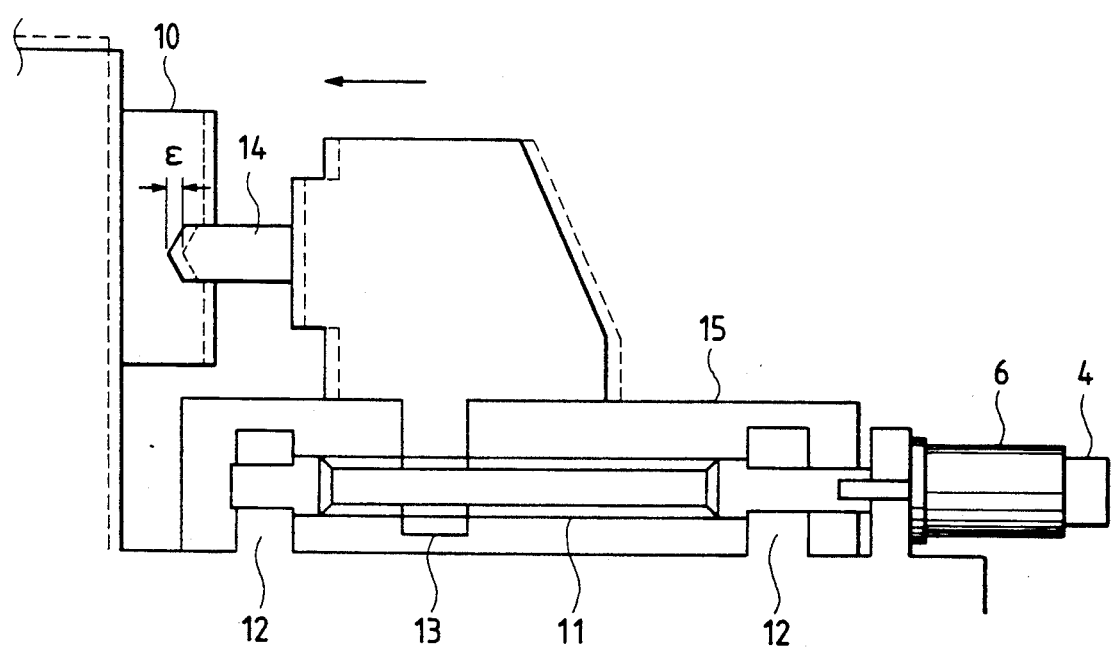
FIG. 5 is a descriptive diagram showing a positioning error due to machine deflection which occurs in machine positioning operation of the conventional numerical control apparatus.

The operation of the numerical control apparatus embodying the present invention will be described in the following. Since the processes in steps 101 to 108 shown in FIGS. 2A and 2B are same as those in steps 1 to 8 shown in FIG. 4 of the conventional numerical control apparatus, the detailed description will be omitted. In step 107, it is determined whether or not the position droop of the motor 6 in the servo system, which is read in step 106, is in a given in-position range in the same manner as step 7 of the conventional numerical control apparatus. However, in step 107, when it is determined that the position droop is not in the given in-position range, the process returns back to step 106. When it is determined that the position droop is in the given in-position range, the process advances to step 110. In step 110, the content of the time cumulating counter 16 is cleared and then the process advances to step 111. In step 111, the time cumulating counter 16 is counted up. In step 112, when the value of the time cumulating counter 16 exceeds the given time period, the process advances to step 115. When the value of the time cumulating counter 16 is in the given time period, the process advances to step 113. In step 113, the current feedback value of the motor 6 is read from the servo control unit 3 and then the process advances to step 114. In step 114, it is determined whether the current feedback value of the motor 6 is in the given range. When it is determined that the current feedback value of the motor 6 is in the given range, the process advances to step 108. When it is determined that the current feedback value of the motor 6 is not in the given range, the process returns back to step 111. When the value of the time cumulating counter 16 exceeds the given time period, the process advances to step 115. In step 115, it is determined that the current feed-back value of the motor 6 does not become the given value or less in the given time and an abnormal signal is output to the external signal output interface section 17. The abnormal signal is output via the external signal output interface section 17 to an external unit such as a sequencer. In step 116, the abnormal signal which is issued in step 115 is input and an emergency stop signal is output to the servo control unit 3 to command the emergency stop.

As described above, when executing the machine in-position check operation, the numerical control apparatus embodying the present invention reads the current feedback value of the motor 6, which varies according to the machine deflection, and checks the current feedback value of the motor 6. When the current feedback value of the motor 6 is in the given range, positioning of the machine is completed. When the current feedback value of the motor 6 is not in the given range, the numerical control apparatus outputs the abnormal signal which informs the outside of the numerical control apparatus of the state and outputs the emergency stop signal to the servo control unit 3.

In the above embodiment, the in-position check operation during the positioning operation of the machine operated by a machining program has been described. However, as in a manual machine positioning operation, even if an operation is executed without a machining program, the operation of steps 104 to 107 and that of steps 110 to 116 shown in FIG. 2 can be applied likewise.

As described above, according to the numerical control apparatus of the present invention, the degree of the positioning error due to the machine deflection is detected through a current feedback value of the motor. The positioning operation is not completed until the current feed-back value of the motor becomes within the given range. Therefore, for example, in the semi-closed loop method, when the machine detection position is away from the machining point of the tool to the workpiece, when the workpiece is heavily cut, or when the sharpness of the tool to the workpiece is degraded, the accuracy of the in-position check process an be further improved.

What is claimed:

1. A numerical control method for determining whether a positioning operation of a machine has been completed, said method comprising:
   (a) receiving machining information for a block of a machining program to be executed;
   (b) interpolating the machining information for the block;
   (c) determining whether an in-position check is to be performed for the machining information;
   (d) receiving a current feedback value when the in-position check is to be performed;
   (e) determining whether the current feedback value is within a given range; and
   (f) completing the position operation of the machine when the current feedback valve is determined to be within the given range, by repeating steps (a)–(e) until all the blocks of the machining program have been executed.

2. A method as recited in claim 1, wherein said method further comprises: (g) completing the positioning operation when the in-position check is not to be performed.

3. A method as recited in claim 1, wherein said method further comprises, between steps (c) and (d), the steps of:
   (g) waiting until an output of an acceleration/deceleration process unit is zero when the in-position check is to be performed;
   (h) obtaining a position droop of a servomotor; and
   (i) waiting until the position droop is within a given in-position range.

4. A method as recited in claim 1, wherein said method further comprises the steps of:
   (j) counting up a count value each time step (e) determines that the current feedback value is not within the given range; and
   (i) outputting an abnormality indication signal and not completing the positioning operation when the count value exceeds a predetermined value.

5. A numerical control method for determining whether a positioning operation of a machine has been completed, said method comprising:
   (a) receiving machining information for a machining operation to be performed;
   (b) interpolating the machining information;
   (c) determining whether an in-position check is to be performed for the machining information;
   (d) receiving a current feedback value when the in-position check is to be performed;
   (e) determining that the positioning operation has been completed when the current feedback value is within a given range.

6. A method as recited in claim 1, wherein said method further comprises:
   (f) outputting an abnormal signal and not completing the positioning operation when the current feedback value is determined not to be within the given range after a predetermined period of time.

7. A method as recited in claim 1, wherein the current feedback value corresponds to a positioning error due to machine deflection.

8. A method as recited in claim 1, wherein the current feedback value corresponds to a positioning error due to machine deflection.

* * * * *